(12) United States Patent
Franke et al.

(10) Patent No.: US 12,480,785 B2
(45) Date of Patent: Nov. 25, 2025

(54) DEVICE AND METHOD FOR DETERMINING AN ENCODER MAGNET ROTATION ANGLE

(71) Applicant: TDK—Micronas GmbH, Freiburg (DE)

(72) Inventors: Jörg Franke, Freiburg (DE); Timo Kaufmann, Freiburg (DE); Johannes Gutmann, Freiburg (DE)

(73) Assignee: TDK—Micronas GmbH, Freiburg (DE)

( * ) Notice: Subject to any disclaimer, the term of this patent is extended or adjusted under 35 U.S.C. 154(b) by 182 days.

(21) Appl. No.: 18/377,001

(22) Filed: Oct. 5, 2023

(65) Prior Publication Data
US 2024/0133714 A1 Apr. 25, 2024

(30) Foreign Application Priority Data
Oct. 5, 2022 (DE) .................... 10 2022 125 701.0

(51) Int. Cl.
*G01D 5/16* (2006.01)
*G01B 7/30* (2006.01)

(52) U.S. Cl.
CPC ....... *G01D 5/16* (2013.01); *G01B 7/30* (2013.01)

(58) Field of Classification Search
CPC ..................................................... G01D 5/145
USPC ........................... 324/207.2, 207.21, 207.25
See application file for complete search history.

(56) References Cited

U.S. PATENT DOCUMENTS

| | | | | |
|---|---|---|---|---|
| 2017/0322014 | A1* | 11/2017 | Jeon | G01D 5/2454 |
| 2020/0064157 | A1* | 2/2020 | Marauska | G01D 5/145 |
| 2022/0196379 | A1* | 6/2022 | Heinz | G01D 5/16 |

FOREIGN PATENT DOCUMENTS

DE 10 2014 109 693 A1 1/2016

* cited by examiner

*Primary Examiner* — Roberto Velez
(74) *Attorney, Agent, or Firm* — Schmeiser, Olsen & Watts, LLP

(57) ABSTRACT

A device for determining an encoder magnet rotation angle is provided, wherein the device includes an encoder magnet and a number of n greater than or equal to two magnet sensors. The magnetic field includes a plurality of plane-parallel magnetic field planes, wherein a surface normal of the plane-parallel magnetic field planes is parallel to an encoder magnet rotation axis. The magnetic field further includes a plurality of magnetic field vectors in the plane-parallel magnetic field planes. The two magnet sensors are in at least one of the plane-parallel magnetic field planes, wherein a first magnetic field vector has a first angle at a position of a first magnet sensor, and wherein a number n−1 of further ones of the magnet sensors are arranged at positions in the magnetic field whose magnetic field vectors have an angle which satisfies the equation $$\theta_i = \theta_{i-1} + \frac{360°}{n},$$

wherein $1 < i \leq n$.

18 Claims, 7 Drawing Sheets

DEVICE AND METHOD FOR DETERMINING AN ENCODER MAGNET ROTATION ANGLE

CROSS-REFERENCE TO RELATED APPLICATIONS

This application claims benefit of and priority to German patent application DE 10 2022 125 701.0, filed on 5 Oct. 2022. The entire disclosure of German patent application DE 10 2022 125 701.0 is hereby incorporated by reference herein.

FIELD OF TECHNOLOGY

The following relates to a device and method for determining an encoder magnet rotation angle.

BACKGROUND

Magnetic or magnet rotation sensors for a non-contact or contactless measurement of an encoder magnet rotation angle are known in the conventional art. These rotation sensors detect a rotation of an encoder magnet about its rotation axis, wherein the encoder magnetic field is generated by a rotating permanent magnet. This detection of the rotation of the encoder magnet is done by measuring an orientation of the magnetic field of the encoder magnet. This measurement of the orientation of the magnetic field is incremental or time-dependent.

For the measurement of the alignment of the magnetic field, one or more rotation or magnet sensors are arranged in the magnetic field of the encoder magnet. These rotation sensors detect an alignment angle of magnetic field vectors in the magnetic field at the position of the rotation sensor(s). The rotation sensors usually consist of several sensor elements. As a single sensor element, a Hall sensor, a TMR sensor, a GMR sensor, an AMR sensor, and/or a fluxgate sensor, for example, is used to detect the alignment angle of the magnetic field.

In this measurement of the alignment angle of the magnetic field by means of the magnetic field sensors by Hall sensors, TMR sensors, GMR sensors, AMR sensors and/or fluxgate sensors, a reduction in the measurement quality and/or parasitic effects in the measurement of the alignment angle of the magnetic field may occur due to the occurrence of stray magnetic fields (often also referred to as "interference fields"). For example, in modern motor vehicles, a large number of high-voltage or control lines are laid in a confined space. Strong electromagnetic fields are generated along these lines, which can act as interference fields in the measurement of the alignment angle of the magnetic field. This parasitic effect of the interference fields is particularly significant in TMR sensors, GMR sensors, AMR sensors (often referred to as "xMR sensors"), and/or fluxgate sensors.

Devices and methods for compensating for these interference fields in Hall sensors, xMR sensors, and/or fluxgate sensors are known. These compensation devices and methods are often based on the separate acquisition of an x-component ($B_x$) and a y-component ($B_y$) of the magnetic field in order to mathematically compensate for the interference fields. xMR sensors, on the other hand, detect only one direction of a magnetic field vector. Mathematical compensation based on the separately recorded x and y components of the magnetic field is not possible with xMR sensors. However, this compensation can be achieved, for example, by means of appropriately oriented multidimensional Hall sensors. Therefore, solutions for compensation of the interference field in Hall sensors, xMR sensors, and/or fluxgate sensors are known in the conventional art. However, these solutions are technically complex and also require considerable installation or construction space.

DE 10 2014 109 693 A1 describes, for example, a device and a method for contactless measurement of an angle. The device comprises a permanent magnet with a number of poles, wherein the number of poles is four or more and is not divisible by three. In a plane below the permanent magnet, at least three first lateral Hall sensors are arranged in a circular path. A method for calculating the angle of rotation using the lateral Hall sensors is also described.

SUMMARY

An aspect relates to a device and a method for determining an encoder magnet rotation angle are provided. The device comprises an encoder magnet and a number of n greater than or equal to two magnet sensors. The encoder magnet is rotatably arranged about a rotation axis or is arranged to rotate about a rotation axis or is rotatable about a rotation axis to generate a magnetic field.

The magnetic field comprises a plurality of plane-parallel magnetic field planes, wherein a surface normal of the plane-parallel magnetic field planes is parallel to the rotation axis of the encoder magnet, and wherein the magnetic field further comprises a plurality of magnetic field vectors arranged in the plane-parallel magnetic field planes. The number of n greater than or equal to two magnet sensors are arranged in at least one of the plane-parallel magnetic field planes, wherein a first magnetic field vector at a position of a first magnet sensor has a first angle, and wherein a number n−1 further ones of the magnet sensors are arranged at positions in the magnetic field whose magnetic field vectors have alignment angles that satisfy the equation:

$$\theta_i = \theta_{i-1} + \frac{360°}{n},$$

wherein $1 < i \leq n$.

With the configuration of the device, it is possible to reliably determine the encoder magnet rotation angle. Furthermore, the configuration of the device makes it possible to reduce the influence of disturbance variables when determining the encoder magnet rotation angle. For example, the configuration of the device can reduce the influence of a stray magnetic field.

In one aspect, in the device, the alignment angles of the magnetic field vectors are measured about or around a rotation axis that is arranged parallel to the rotation axis of the encoder magnet. Further, the alignment angles extend in one of the plane-parallel magnetic field planes.

With the configuration of the device, it is possible to reduce the influence of disturbance variables in the determination of the encoder magnet rotation angle. For example, the configuration of the device may reduce the influence of a stray magnetic field.

In a further aspect, the device has the n magnet sensors arranged along a respective magnetic field vector of constant magnetic field strength.

With the configuration of the device, it is possible to reduce the influence of disturbance variables in the determination of the encoder magnet rotation angle. For example, the configuration of the device can reduce the influence of a stray magnetic field.

In another aspect, in the device, the n magnet sensors are arranged in a single one of the plane-parallel magnetic field planes.

With the configuration of the device, it is possible to reduce the influence of disturbance variables in determining the encoder magnet rotation angle. For example, with the configuration of the device, the influence of a stray magnetic field can be reduced. Furthermore, by arranging the magnet sensors in a single plane parallel to the plane, it is possible to arrange these magnet sensors in a cost-effective and mechanically stable manner, for example on a single substrate. Thereby, installation space can be saved and electrical contacts between the magnet sensors with each other and/or with a signal processor can be easily established.

In a further aspect, in the device, the n magnet sensors are arranged in different ones of the plane-parallel magnetic field planes.

With the configuration of the device, it is possible to reduce the influence of disturbance variables in determining the encoder magnet rotation angle. For example, by configuring the device, the influence of a stray magnetic field can be reduced. Furthermore, by arranging the magnet sensors in different planes, it is possible to arrange the magnet sensors closer to each other and/or partially overlapping. This can save installation space.

In a further aspect, the n magnet sensors are arranged at positions in the magnetic field at which a maximum value of an amplitude of the magnetic field vector over a full rotation or revolution of the encoder magnet about its axis of rotation in the x-direction of a/the base coordinate system is equal to the maximum value of the amplitude of the magnetic field vector in the y-direction of the base coordinate system.

With the configuration of the device, it is possible to further reduce the influence of disturbance variables in the determination of the encoder magnet rotation angle.

In another aspect, the magnet sensors comprise at least two of a tunnel magnetoresistance element, a giant magnetoresistance element, a 1D Hall sensor element, an anisotropic magnetoresistance element, and a fluxgate element.

With the configuration of the device, it is possible to reduce the influence of disturbance variables in determining the encoder magnet rotation angle by at least two tunnel magnetoresistance elements, at least two giant magnetoresistance elements, at least two 1D Hall sensor elements, at least two anisotropic magnetoresistance elements, or at least two fluxgate elements. For example, the configuration of the device can reduce the influence of a stray magnetic field. In addition, the use of at least two sensor elements each as a magnetic field sensor makes it possible to obtain two measurement signals that enable determination of the magnetic field in the x- and y-directions.

In another aspect, the device comprises a number of n greater than or equal to three magnet sensors, wherein the n greater than or equal to three magnet sensors comprise at least one of a tunnel magnetoresistance element, a giant magnetoresistance element, a 1D Hall sensor element, an anisotropic magnetoresistance element, and a fluxgate element, respectively.

By configuring the device with a number of n greater than or equal to three magnet sensors, each comprising at least one of a tunnel magnetoresistance element, a giant magnetoresistance element, a 1D Hall sensor element, an anisotropic magnetoresistance element, and a fluxgate element, it is possible to reduce the influence of disturbance variables in determining the encoder magnet rotation angle. For example, by configuring the device, the influence of a stray magnetic field can be reduced. In addition, the use of at least three magnet sensors with one magnet sensor element each makes it possible to obtain at least three measurement signals, which enable a reliable determination of the encoder magnet rotation angle with a smaller number of magnet sensor elements (e.g., only three magnet sensor elements).

In another aspect, the encoder magnet comprises at least one of a bar magnet, a round magnet, a disc magnet, a ring magnet, and a yoke magnet.

In a configuration, the device is capable of reducing the influence of disturbance variables in determining the encoder magnet rotation angles for a plurality of different encoder magnets, such as a bar magnet, a round magnet, a disc magnet, a ring magnet, and a yoke magnet.

In another aspect, a method for or of constructing an encoder magnet rotation angle determining device comprises generating a magnetic field, arranging a first magnet sensor in the magnetic field, wherein a first magnetic field vector at a position of a first magnet sensor has a first alignment angle, determining a measurement signal output from the magnet sensor, arranging a number of n−1 further ones of the magnet sensors at positions in the magnetic field, and determining a measurement signal output from the n−1 further arranged magnet sensor. The magnetic field comprises a plurality of plane-parallel magnetic field planes, wherein a surface normal of the plane-parallel magnetic field planes is parallel to the rotation axis, and wherein the magnetic field further comprises a plurality of magnetic field vectors. The arranging of a number of n−1 further ones of the magnet sensors takes place at positions in the magnetic field whose magnetic field vectors have alignment angles which satisfy the following equation:

$$\theta_i = \theta_{i-1} + \frac{360°}{n},$$

wherein $1 < i \leq n$.

In another aspect, the use of a device or an encoder magnet rotation angle determining device constructed according to the construction method for determining an encoder magnet rotation angle of an encoder magnet using n magnet sensor elements is disclosed.

In another aspect, a device and a method for determining an encoder magnet rotation angle are provided. The device comprises an encoder magnet and a number of n greater than or equal to two magnetoresistive elements. The encoder magnet is rotatably arranged about a rotation axis or is arranged to rotate about a rotation axis or is rotatable about a rotation axis to generate a magnetic field. The magnetic field comprises a plurality of plane-parallel magnetic field planes, wherein a surface normal of the plane-parallel magnetic field planes is parallel to the rotation axis, and wherein the magnetic field further comprises a plurality of magnetic field vectors arranged in the plane-parallel magnetic field planes. The number of n greater than or equal to two magnetoresistive elements are arranged in at least one of the plane-parallel magnetic field planes, wherein a first magnetic field vector at a position of a first magnetoresistive element has a first angle, and wherein a number n−1 further ones of the magnetoresistive elements are arranged at positions in the magnetic field whose magnetic field vectors have alignment angles that satisfy the equation $$\theta_i = \theta_{i-1} + \frac{360°}{n},$$

wherein $1 < i \leq n$.

With the configuration of the device, it is possible to reliably determine the encoder magnet rotation angle. Furthermore, the configuration of the device makes it possible to reduce the influence of disturbance variables when determining the encoder magnet rotation angle. For example, the configuration of the device can reduce the influence of a stray magnetic field.

In one aspect, the alignment angle of the magnetic field vectors in the device are measured about a rotation axis that is parallel to the rotation axis. Further, the alignment angles extend in one of the plane-parallel magnetic field planes.

With the configuration of the device, it is possible to reduce the influence of disturbance variables in determining the encoder magnet rotation angle. For example, the configuration of the device may reduce the influence of a stray magnetic field.

In a further aspect of the device, the n magnetoresistive elements are arranged along a respective magnetic field vector of constant magnetic field strength.

With the configuration of the device, it is possible to reduce the influence of disturbance variables in determining the encoder magnet rotation angle. For example, with the configuration of the device, the influence of a stray magnetic field can be reduced.

In another aspect of the device, the n magnetoresistive elements are arranged in a single one of the plane-parallel magnetic field planes.

With the configuration of the device, it is possible to reduce the influence of disturbance variables in determining the encoder magnet rotation angle. For example, by configuring the device, the influence of a stray magnetic field can be reduced. Furthermore, by arranging the magnetoresistive elements in a single plane-parallel magnetic field plane, it is possible to arrange these magnetoresistive elements in a cost-effective and mechanically stable manner, for example on a single substrate. In this way, installation space can be saved and electrical contacts between the magnetoresistive elements with each other and/or with a signal processor can be easily established.

In another aspect, in the device, the n magnetoresistive elements are arranged in respective different ones of the plane-parallel magnetic field planes.

With the configuration of the device, it is possible to reduce the influence of disturbance variables in determining the encoder magnet rotation angle. For example, by configuring the device, the influence of a stray magnetic field can be reduced. Furthermore, by arranging the magnetoresistive elements in different magnetic field planes, it is possible to arrange the magnetoresistive elements closer to each other and/or partially overlapping. This can save installation space.

In another aspect, the magnetoresistive elements comprise at least one of a magnetic tunnel resistor, a giant magnetoresistance, and an anisotropic magnetoresistance element.

With the configuration of the device, it is possible to reduce the influence of disturbance variables in determining the encoder magnet rotation angle using a magnetic tunnel resistor, a giant magnetoresistance, and an anisotropic magnetoresistance element. For example, the configuration of the device can reduce the influence of a stray magnetic field.

In another aspect, the encoder magnet comprises at least one of a bar magnet, a disc magnet, a ring magnet, and a yoke magnet.

With the configuration of the device, it is possible to reduce the influence of disturbance variables in determining the encoder magnet rotation angles for a plurality of different encoder magnets such as a bar magnet, a disc magnet, a ring magnet, and a yoke magnet.

In another aspect, a method for determining an encoder magnet rotation angle of an encoder magnet about a rotation axis comprises generating a magnetic field by the encoder magnet; arranging a first magnetoresistive element in the magnetic field; arranging a number n−1 of further ones of the magnetoresistive elements at positions in the magnetic field whose magnetic field vectors have alignment angles that satisfy the equation $$\theta_i = \theta_{i-1} + \frac{360°}{n},$$

wherein $1 < i \leq n$;
measuring the measurement signals output from the n magnetoresistive elements; and determining the encoder magnet rotation angle from the measured measurement signals. The magnetic field comprises a plurality of plane-parallel magnetic field planes. A surface normal of the plane-parallel magnetic field planes is parallel to the rotation axis. The magnetic field further comprises a plurality of magnetic field vectors. The first magnetic field vector has a first angle at a position of a first magnetoresistive element.

With the configuration of the method, it is possible to reliably determine the encoder magnet rotation angle. Furthermore, the configuration of the method makes it possible to reduce the influence of disturbance variables in the determination of the encoder magnet rotation angle. For example, the influence of a stray magnetic field can be reduced with the configuration of the method. Furthermore, with the configuration of the method, it is possible to arrange a number of n−1 further of the magnetoresistive elements in the magnetic field in such a way as to reduce the influence of disturbance variables in the determination of the encoder magnet rotation angle.

In another aspect, the use of a device or method for determining an encoder magnet rotation angle of an encoder magnet using n magnetoresistive elements is disclosed.

BRIEF DESCRIPTION

Some of the embodiments will be described in detail, with reference to the following figures, wherein like designations denote like members, wherein.

DETAILED DESCRIPTION

Figure 1A:
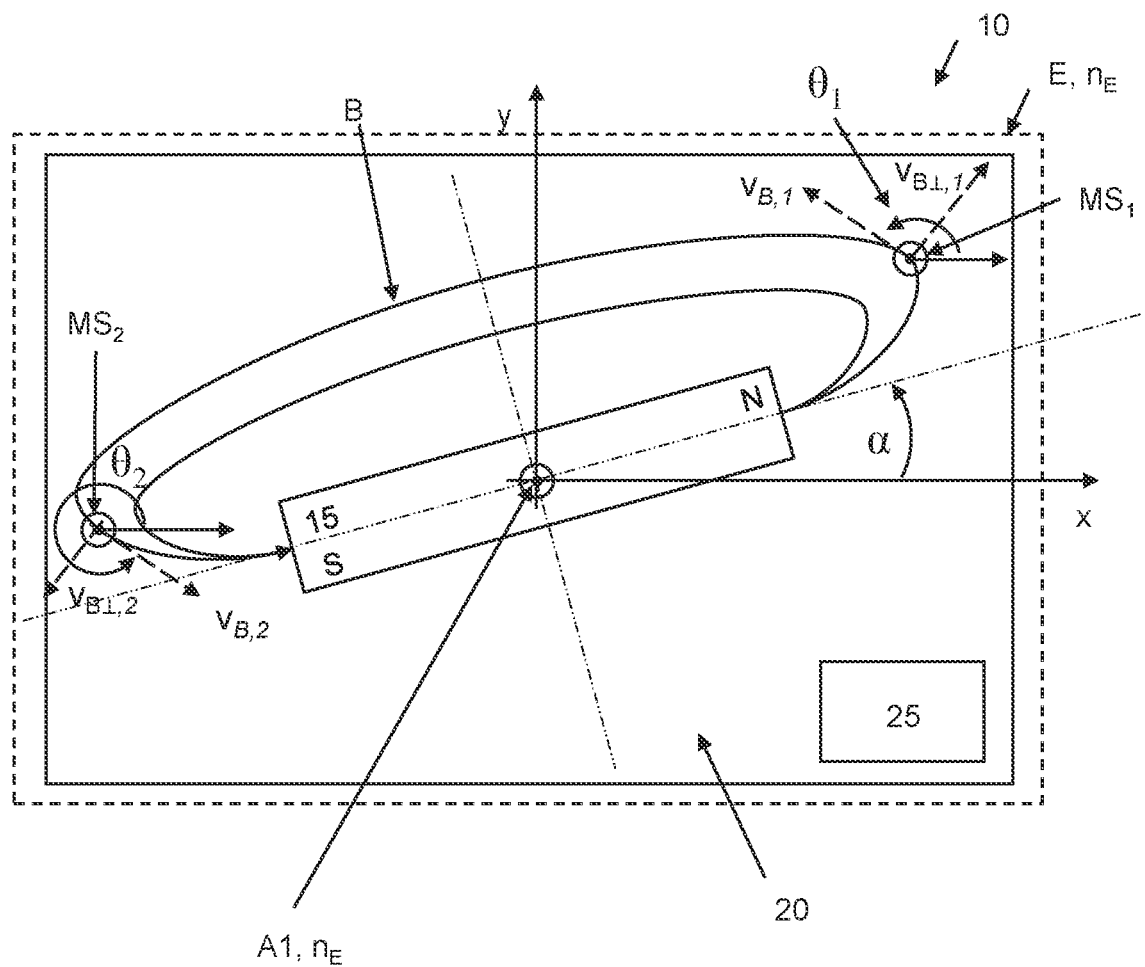
FIG. 1a shows a top view of a first configuration of a device for determining an encoder magnet rotation angle using n=2 magnet sensors.

FIG. 1a shows a top view of a first configuration of a device 10 for determining an encoder magnet rotation angle α. The device 10 comprises an encoder magnet 15 and a number of n greater than or equal to two (n≥2) magnet sensors, respectively magnetoresistive elements $MS_1, \ldots, MS_n$. The encoder magnet 15 comprises at least one of a bar magnet, a round magnet, a disc magnet, a ring magnet, and a yoke magnet (often referred to as "magnet shapes" or "magnet designs").

In the first configuration, the magnet sensors $MS_1, \ldots, MS_n$ comprise at least two of a tunnel magnetoresistance (TMR) element, a giant magnetoresistance (GMR) element, a 1D Hall sensor element and an anisotropic magnetoresistance (AMR) element. Of course, combinations of the aforementioned sensor elements are also possible, provided that at least two elements are combined with each other. Moreover, it will be apparent to those skilled in the conventional art that, for example, that two 1D Hall sensor elements can be substituted by one 2D Hall sensor element without departing from the scope of embodiments of the invention.

The encoder magnet 15 generates a magnetic field B. The encoder magnet 15 is arranged to rotate about a rotation axis A1. The rotation axis A1 is orthogonal to an x-axis and a y-axis of a base coordinate system. The rotation axis A1 is parallel to a z-axis of the base coordinate system. The x-axis and the y-axis span a base coordinate plane.

The magnetic field B comprises a plurality of plane-parallel magnetic field planes E. The plane-parallel magnetic field planes E are parallel to the base coordinate plane. Each of the plane-parallel magnetic field planes E has a surface normal $n_E$ which is orthogonal to the plane-parallel magnetic field plane. The surface normals $n_E$ of the plane-parallel magnetic field planes E are plane-parallel to each other. The surface normals $n_E$ of the plane-parallel magnetic field planes E are parallel to the rotation axis A1.

The magnetic field B comprises a plurality of magnetic field lines. A strength and an orientation of the magnetic field B can be expressed at any point in the magnetic field B by magnetic field vectors $v_{B,i}$. The magnetic field vectors $v_{B,i}$ denote the strength and the orientation of the magnetic field B at an arbitrary position (hereinafter denoted with a count variable "i"; see below) in the magnetic field B. The magnetic field vectors $v_{B,i}$ extend in the plane-parallel magnetic field planes E. The magnetic field vectors $v_{B,i}$ are arranged in the plane-parallel magnetic field planes E.

Each of the magnetic field vectors $v_{B,i}$ has an x-component $v_{Bx,i}$ and a y-component $v_{By,i}$. The x-component $v_{Bx,i}$ of the magnetic field vector $v_{B,i}$ denotes the strength and orientation of the magnetic field B in the x-direction of the base coordinate system. The y-component $v_{By,i}$ of the magnetic field vector $v_{B,i}$ denotes the strength and the orientation of the magnetic field B in the y-direction of the base coordinate system.

The magnetic field vectors $v_{B,i}$ at the position in the magnetic field B have an alignment angle $\theta_n$. The alignment angle $\theta_n$ denotes the alignment of the magnetic field vectors $v_{B,i}$ at the positions in the magnetic field B. The alignment angle $\theta_n$ is defined relative to the x-axis of the base coordinate system. The alignment angle $\theta_n$ of the magnetic field vectors $v_{B,i}, \ldots v_{B,n}$ is thus measured about a rotation axis, which is arranged parallel to the rotation axis A1. The alignment angle $\theta_n$ extends in one of the plane-parallel magnetic field planes E. The alignment angle $\theta_n$ is defined about an axis which extends parallel to the z-axis of the base coordinate system.

For determining the encoder magnet rotation angle α of the encoder magnet 15, the number of n greater than or equal to two magnet sensors $MS_1, \ldots, MS_n$ is located in the magnetic field B. The number of n greater than or equal to two magnet sensors $MS_1, \ldots, MS_n$ are arranged in at least one of the plane-parallel magnetic field planes E. However, the magnet sensors $MS_1, \ldots, MS_n$ do not detect the encoder magnet rotation angle α, but the alignment angle $\theta_n$ at the positions of the magnet sensors $MS_1, \ldots, MS_n$ in the magnetic field. However, via a detection of the change of the alignment angle $\theta_n$, it is possible to indirectly detect a change of the encoder magnet rotation angle α.

In another aspect, the number of n is greater than or equal to two magnet sensors $MS_1, \ldots, MS_n$ arranged on a substrate 20 or printed circuit board (PCB). In a further aspect, at least one signal processor 25 is further arranged on the substrate 20. The substrate 20 extends in a magnetic field plane that is plane-parallel to at least one of the plurality of plane-parallel magnetic field planes E. The number of n greater than or equal to two magnet sensors $MS_1, \ldots, MS_n$ are electrically connected to each other and/or to the signal processor 25. The signal processor 25 can accept measuring signals from the magnet sensors $MS_1, \ldots, MS_n$ and calculate the value of the encoder magnet rotation angle α. By (pre)configuring the magnet sensors $MS_1, \ldots, MS_n$ or by converting a measurement signal received from the magnet sensors $MS_1, \ldots, MS_n$, it is possible, for example, to determine a change in the encoder magnet rotation angle α mathematically from the amendment of the alignment angle $\theta_n$. In addition, this makes it possible to determine an absolute value of the encoder magnet rotation angle α.

A first magnet sensor $MS_1$ is/are arranged in the magnetic field B at a first position. The magnetic field B has a first magnetic field vector $v_{B,1}$ at this first position. The first magnetic field vector $v_{B,1}$ has a first angle $\theta_1$ at this first position.

To reduce influences of disturbance variables in the determination of the encoder magnet rotation angle α, the number n−1 further of the magnet sensors $MS_2, \ldots, MS_n$ is arranged at positions in the magnetic field B whose magnetic field vectors $v_{B,2}, \ldots v_{B,n}$ have alignment angle $\theta_2, \ldots, \theta_n$. The number n−1 of further magnet sensors $MS_2, \ldots, MS_n$ are arranged at positions in the magnetic field B whose alignment angle $\theta_2, \ldots, \theta_n$ satisfies the following equation $$\theta_i = \theta_{i-1} + \frac{360°}{n},$$

wherein 1<i≤n.

In the above equation, i denotes a count variable which is greater than 1 (one) and less than or equal to the number of n greater than or equal to two magnet sensors $MS_1, \ldots, MS_n$. Accordingly, the count variable i is used to denote the alignment angle of the nth magnet sensor $MS_2, \ldots, MS_n$. For example, for a number of n=5 (n equals five) magnet sensors $MS_1, MS_2, MS_3, MS_4, MS_5$, the first alignment angle is denoted by the character $\theta_1$, a second alignment angle is denoted by the character $\theta_2$, a third alignment angle is denoted by the character $\theta_3$, a fourth alignment angle is denoted by the character $\theta_4$, and a fifth alignment angle is denoted by the character $\theta_5$. The example of a number of n=5 (n equals five) magnet sensors $MS_1$, $MS_2$, $MS_3$, $MS_4$, $MS_5$ given here does not limit embodiments of the invention and is only used to illustrate the use of the count variable i.

In the first configuration, the device 10 comprises, for example, a number of n=2 (n equals two) magnet sensors $MS_1$, $MS_2$. The first magnet sensor $MS_1$ is arranged at the first position in the magnetic field B. A first magnetic field vector $v_{B,1}$ is defined at the first position. In the configuration shown in FIG. 1a, the first alignment angle $\theta_1$ of the first magnetic field vector $v_{B,1}$ is a value of $\theta_1=120°$ relative to the x-component of the first magnetic field vector $v_{B,1}$.

The position for the arrangement of the second magnet sensor $MS_2$ can be determined using the above equation. As an example, the calculation of the second alignment angle $\theta_2$ is shown below. As mentioned before, the first alignment angle in the example shown in FIG. 1a has a value of $\theta_1=120°$. Accordingly, the following results for the second alignment angle $\theta_3$:

$$\theta_2 = \theta_1 + \frac{360°}{2} = 300°$$

Accordingly, the second magnet sensor $MS_2$ is/is arranged at a second position in the magnetic field B, at which second position a second alignment angle $\theta_2$ of a second magnetic field vector $v_{B,2}$ has a value of $\theta_2=300°$ relative to the x-component of the second magnetic field vector $v_{B,2}$. Accordingly, the second magnet sensor $MS_2$ is/will be located at an arbitrary position in the magnetic field B which satisfies this condition $\theta_2=300°$. This reduces the influence of disturbance variables in the determination of the encoder magnet rotation angle $\alpha$.

In a further aspect, the n magnet sensors $MS_1, \ldots, MS_n$ are arranged along a respective magnetic field vector $v_{B,i}$ of constant magnetic field strength. Further, in another aspect, the n magnet sensors $MS_1, \ldots, MS_n$ may be arranged in a single one of the plane-parallel magnetic field planes E. Alternatively, the n magnet sensors $MS_1, \ldots, MS_n$ may be arranged in different ones of the plane-parallel magnetic field planes E, respectively.

Figure 1B:
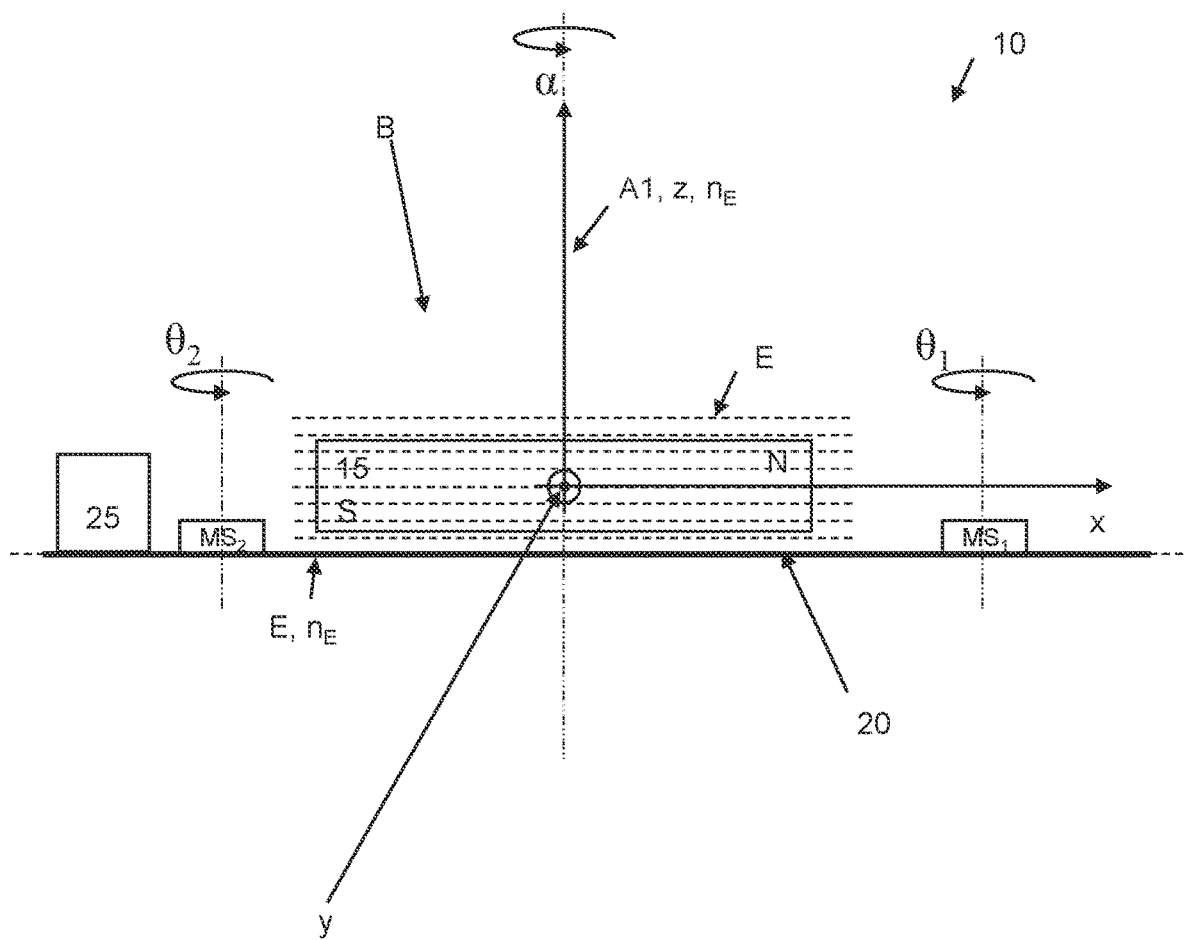
FIG. 1b shows a side view of the first configuration of the device for determining the encoder magnet rotation angle using n=2 magnet sensors.

FIG. 1b shows a side view of the first configuration of the device 10 for determining the encoder magnet rotation angle $\alpha$. The device 10 comprises the encoder magnet 15 and the number of n greater than or equal to two (n≥2) magnet sensors $MS_1, \ldots, MS_n$. As can be seen from FIG. 1b, the encoder magnet 15 is arranged to rotate about a rotation axis A1. The rotation axis A1 is orthogonal to the x-axis and the y-axis of the base coordinate system. The rotation axis A1 is parallel to a z-axis of the base coordinate system. The x-axis and the y-axis span a base coordinate plane. The magnetic field B comprises a plurality of plane-parallel magnetic field planes E. The plane-parallel magnetic field planes E are parallel to the base coordinate plane.

Figure 2:
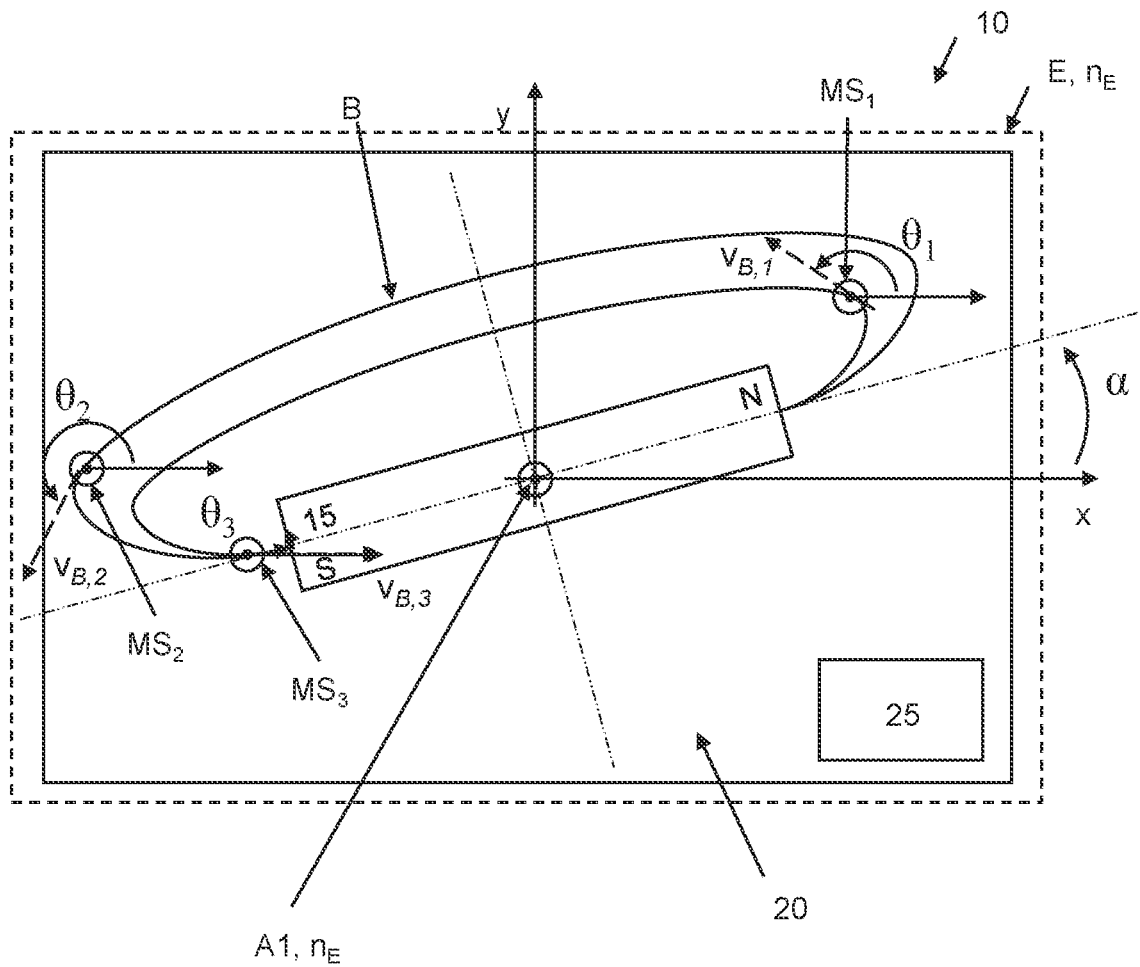
FIG. 2 shows a second configuration of the device for determining the encoder magnet rotation angle using n=3 magnet sensors.

FIG. 2 shows a top view of a second configuration of the device 10 for determining the encoder magnet rotation angle $\alpha$. The device 10 of the second configuration comprises an encoder magnet 15 and a number of n=3 (n equals three) magnet sensors $MS_1$, $MS_2$, $MS_3$. The first magnet sensor $MS_1$ has a first alignment angle $\theta_1=120°$.

The position for the arrangement of the second magnet sensor $MS_2$ and the third magnet sensor $MS_3$ can be determined by the equation explained before. As an example, the calculation of the second alignment angle $\theta_2$ and the third alignment angle $\theta_3$ is shown below. As mentioned before, the first alignment angle $\theta_1$ in the configuration shown in FIG. 2 has a value of $\theta_1=120°$. Accordingly, the following results for the second alignment angle $\theta_2$ $$\theta_2 = 120° + \frac{360°}{3} = 240°$$

as well as for the third alignment angle $\theta_3$ $$\theta_3 = 240° + \frac{360°}{3} = 360°$$

Accordingly, the second magnet sensor $MS_2$ is/is arranged at a second position in the magnetic field B, at which second position a second alignment angle $\theta_2$ of a second magnetic field vector $v_{B,2}$ has a value of $\theta_2=240°$ relative to the x-component of the second magnetic field vector $v_{B,2}$. Accordingly, the second magnet sensor $MS_2$ is/will be located at any position in the magnetic field B that satisfies this condition $\theta_2=240°$. This reduces the influence of disturbance variables in the determination of the encoder magnet rotation angle $\alpha$.

Accordingly, the third magnet sensor $MS_3$ is/are arranged at a third position in the magnetic field B, at which third position a third alignment angle $\theta_3$ of a third magnetic field vector vB,3 is a value of $\theta_3=360°$ relative to the x-component of the third magnetic field vector vB,3. Accordingly, the third magnet sensor $MS_3$ is/will be located at any position in the magnetic field B that satisfies this condition $\theta_3=360°$. This reduces the influence of disturbance variables in the determination of the encoder magnet rotation angle $\alpha$.

Figure 3:
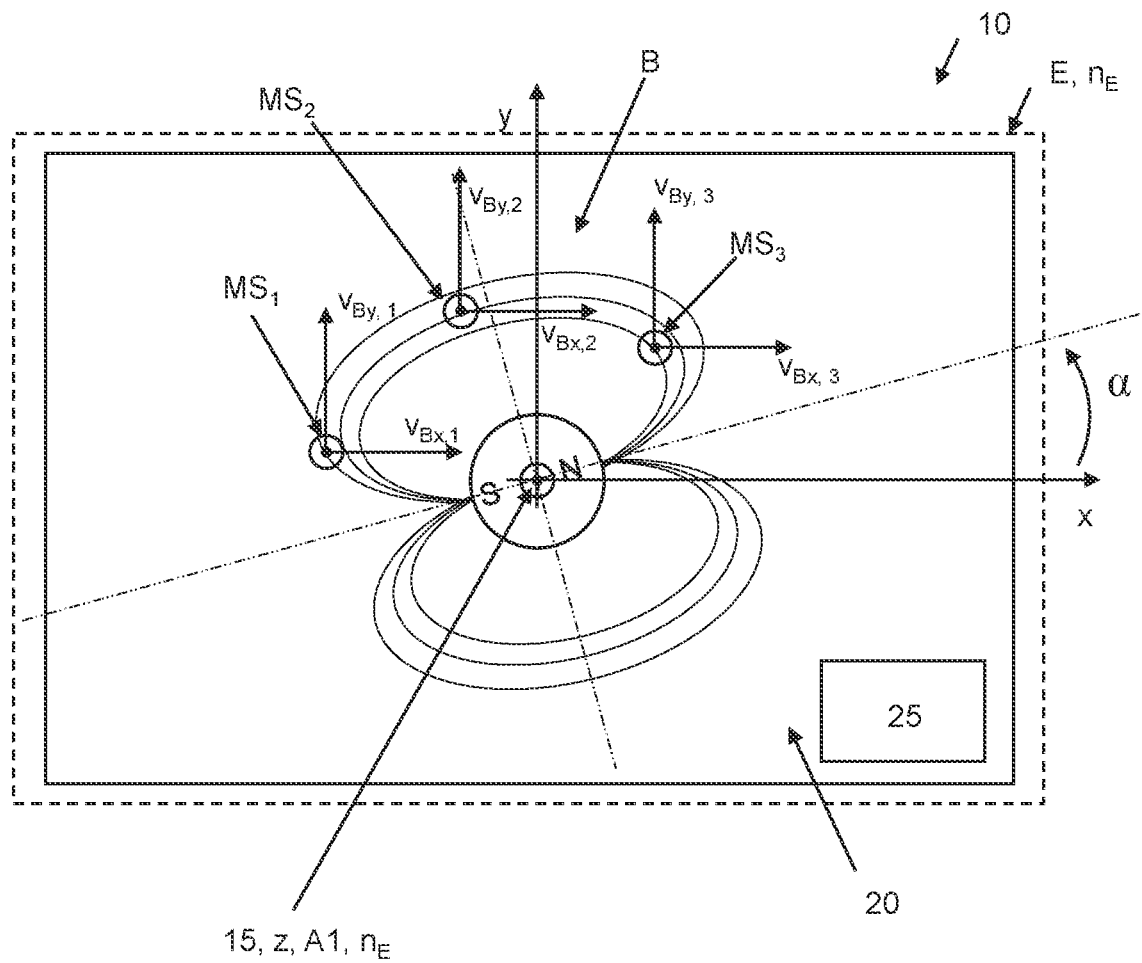
FIG. 3 shows a third configuration of the device for determining the encoder magnet rotation angle.

FIG. 3 shows a third configuration of the device 10, in which a round magnet is used as encoder magnet 15. This illustration is only exemplary; of course, other designs of magnets can be used. The device 10 corresponds essentially to the device 10 of the second configuration (see above). To further reduce the influences of disturbance variables when determining the encoder magnet rotation angle $\alpha$, the magnet sensors $MS_1, \ldots, MS_n$, each of the magnet sensors $MS_1, \ldots, MS_n$, are arranged at positions in the magnetic field B at which a maximum value of an amplitude of the magnetic field vector over a full rotation (i.e. $\alpha=360°$) of the encoder magnet 15 about its rotation axis A1 in the x-direction of the base coordinate system is equal to the maximum value of the amplitude of the magnetic field vector in the y-direction. In simplified terms, the magnet sensors $MS_1, \ldots, MS_n$ are arranged at positions in the magnetic field B (designated by the count variable "i") at which the following equation is fulfilled:

$$\max(|v_{Bx,i}|) = \max(|v_{By,i}|)$$

The magnet sensors $MS_1, \ldots, MS_n$ are all arranged in a single magnetic field plane E. However, the magnet sensors $MS_1, \ldots, MS_n$ can also be arranged in different plane-parallel magnetic field planes E.

Figure 4:
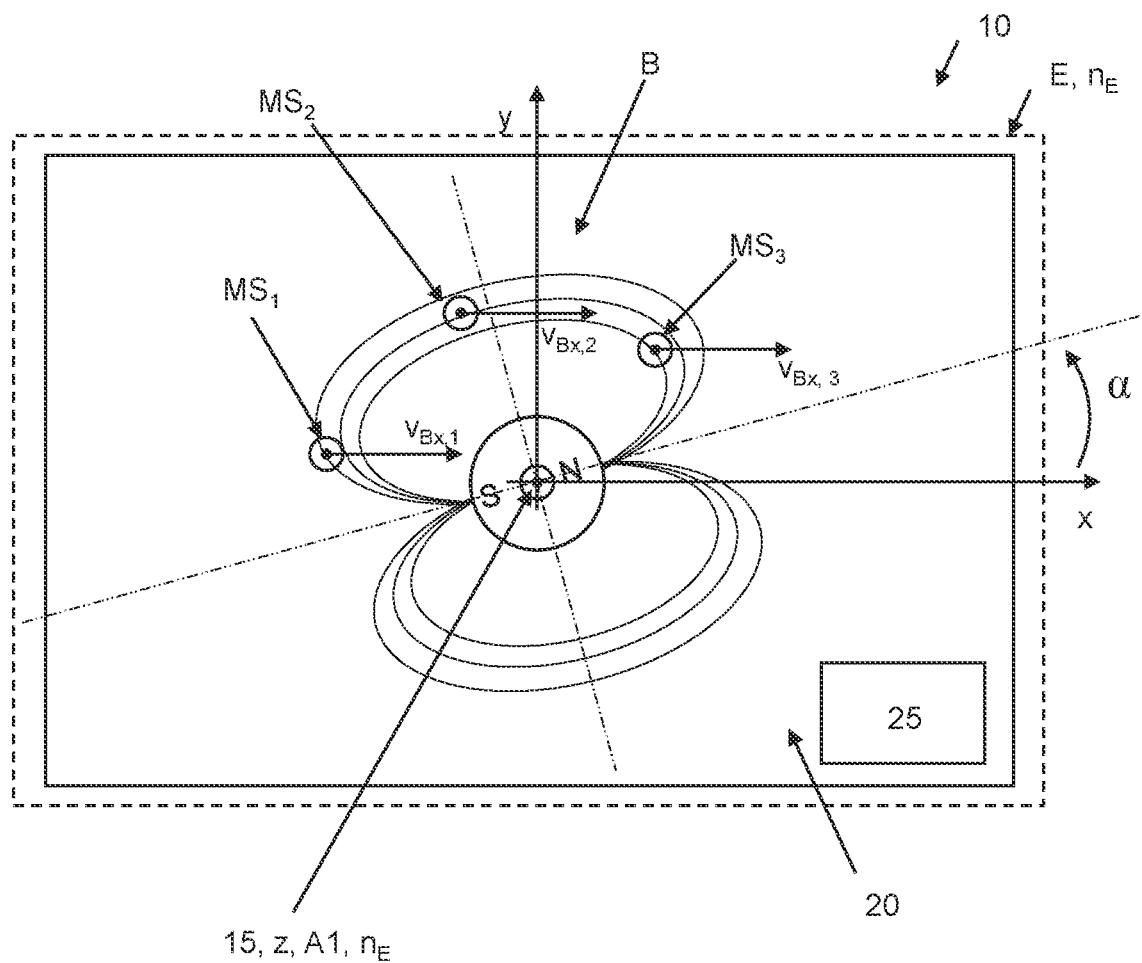
FIG. 4 shows a fourth configuration of the device for determining the encoder magnet rotation angle.

FIG. 4 shows a fourth configuration of the device 10, in which (similar to the third configuration) a round magnet is used as encoder magnet 15. This illustration is only exemplary; of course, other designs of magnets may be used. The device 10 is essentially the same as the device 10 of the second configuration (see above), but in this configuration a number of n greater than or equal to three magnet sensors $MS_1, \ldots, MS_n$ is/are arranged in the magnetic field B. Just as in the previous configurations, in the fourth configuration a first magnet sensor $MS_1$ is/are first arranged in the magnetic field B at a first position. Then the number n−1 of further magnet sensors $MS_2, \ldots, MS_n$ is/are arranged at positions in the magnetic field B whose alignment angle $\theta_2, \ldots, \theta_n$ satisfies the following equation $$\theta_i = \theta_{i-1} + \frac{360°}{n},$$

wherein 1<i≤n.

It should be noted here that (unlike in the first configuration) a total of at least three magnet sensors $MS_1, \ldots, MS_n$ are arranged in the magnetic field B.

These at least three magnet sensors $MS_1, \ldots, MS_n$ of the fourth configuration thereby comprise (different from the first configuration) at least one each of a tunnel magnetoresistance element, a giant magnetoresistance element, a 1D Hall sensor element, and an anisotropic magnetoresistance element.

Each of these at least three magnet sensors $MS_1, \ldots, MS_n$ is thereby arranged to detect an x-component or a y-component of the magnetic field vector $v_{B,i}$ at the respective position of the magnet sensor $MS_i$. For example, in the example of the fourth configuration shown in FIG. 4, each of the three magnet sensors $MS_1, \ldots, MS_3$ detects the x-component of the magnetic field vector $v_{B,i}$ at the respective position.

Figure 5:
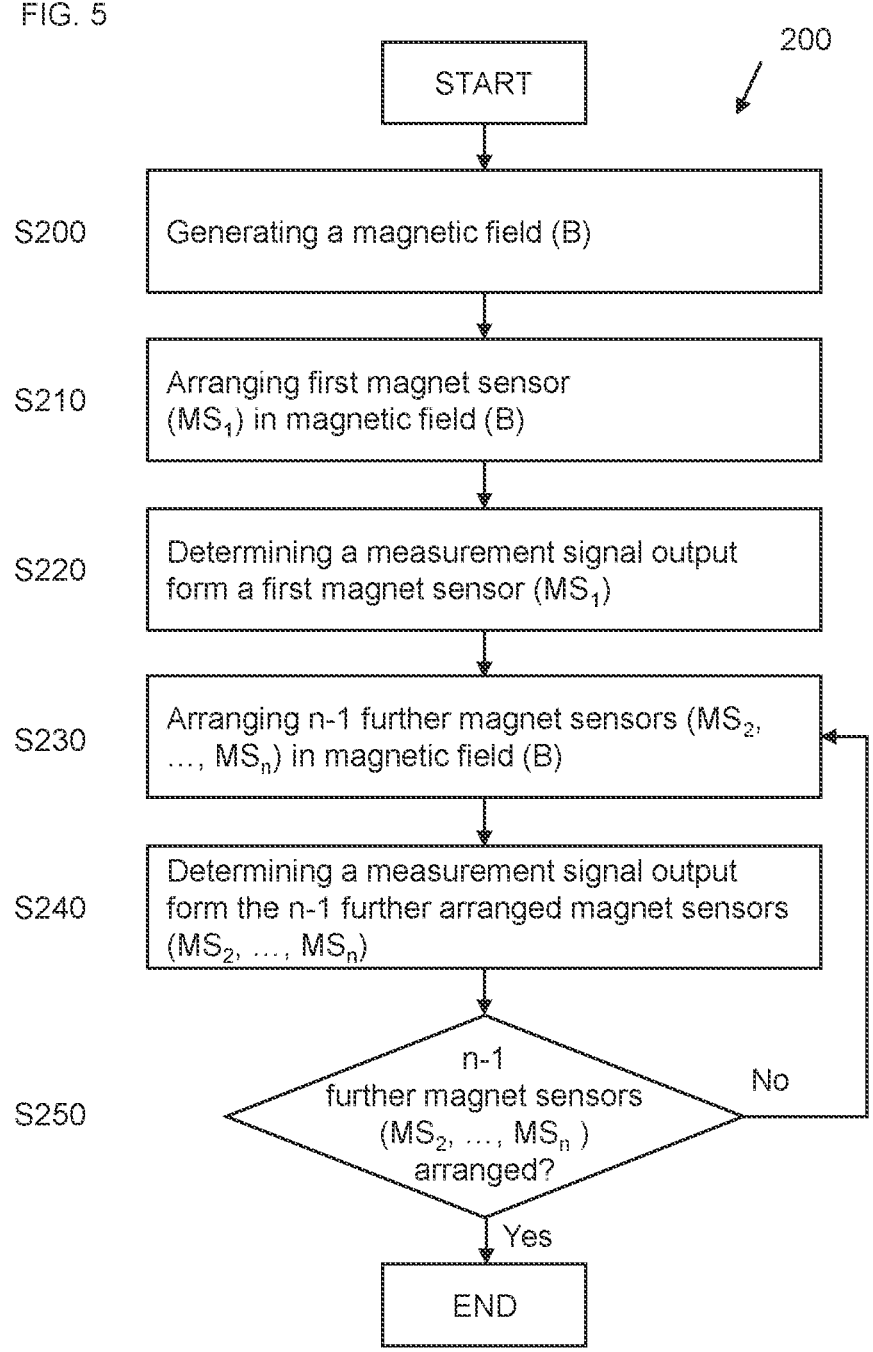
FIG. 5 shows a process flow diagram depicting a method for constructing an encoder magnet rotation angle determining device.

FIG. 5 illustrates a method 200 for constructing an encoder magnet rotation angle determining device 10. In embodiments, the method 200 comprises first generating in step S200 the magnetic field B by means of the encoder magnet 15.

In embodiments, the method 200 comprises further arranging in step S210 the first magnet sensor $MS_1$ in the magnetic field B, wherein the first magnetic field vector $v_{B,1}$ at the first position of the first magnet sensor $MS_1$ has the first alignment angle $\theta_1$.

In embodiments, the method 200 further comprises determining, in step S220, a measurement signal output from the first magnet sensor $MS_1$. In an embodiment, this measurement signal is an angular signal via which conclusions can be drawn directly about the orientation of the magnetic field B. Alternatively, however, this measurement signal can also be a sinusoidal or cosinusoidal output signal from which, for example, angle information or an angle signal is determined by means of the signal processor 25.

In embodiments, the method 200 further comprises arranging in step S230 a number of n−1 further ones of the magnet sensors $MS_2, \ldots, MS_n$ at positions in the magnetic field B whose magnetic field vectors $v_{B,2}, \ldots v_{B,n}$ have alignment angles $\theta_2, \ldots, \theta_n$ that satisfy the equation $$\theta_i = \theta_{i-1} + \frac{360°}{n},$$

wherein 1<i≤n.

Here, the n magnet sensors $MS_1, \ldots, MS_n$ may be arranged in a single one of the plane-parallel magnetic field planes E, in a plurality of the plane-parallel magnetic field planes E, or in different ones of the plane-parallel magnetic field planes E, respectively.

Furthermore, then magnet sensors $MS_1, \ldots, MS_n$ may be arranged in this case at positions in the magnetic field B at which a maximum value of an amplitude of the magnetic field vector over a full rotation of the encoder magnet 15 about its axis of rotation A1 in the x-direction of a/the base coordinate system is equal to the maximum value of the amplitude of the magnetic field vector in the y-direction.

The n magnet sensors $MS_1, \ldots, MS_n$ may here comprise at least two of a tunnel magnetoresistance element, a giant magnetoresistance element, a 1D Hall sensor element, an anisotropic magnetoresistance element, and a fluxgate element. Alternatively, provided that the device 10 comprises greater than or equal to three magnet sensors $MS_1, \ldots, MS_n$, each of these magnet sensors $MS_1, \ldots, MS_n$ may each comprise at least one of a tunnel magnetoresistance element, a giant magnetoresistance element, a 1D Hall sensor element, an anisotropic magnetoresistance element, and a fluxgate element.

In embodiments, the method 200 further comprises determining in step S240 a measurement signal output from the n−1 further arranged magnet sensor $MS_2, \ldots, MS_n$, more specifically each of the n−1 further arranged magnet sensor $MS_2, \ldots, MS_n$. This determination of the measurement signal may thereby be performed, for example, by means of a computer simulation or other suitable means for the determination (laboratory tests, calculations, etc.).

In embodiments, the method 200 comprises further a checking in step S250 whether the total number of n magnet sensors $MS_1, \ldots, MS_n$ have been arranged.

Figure 6:
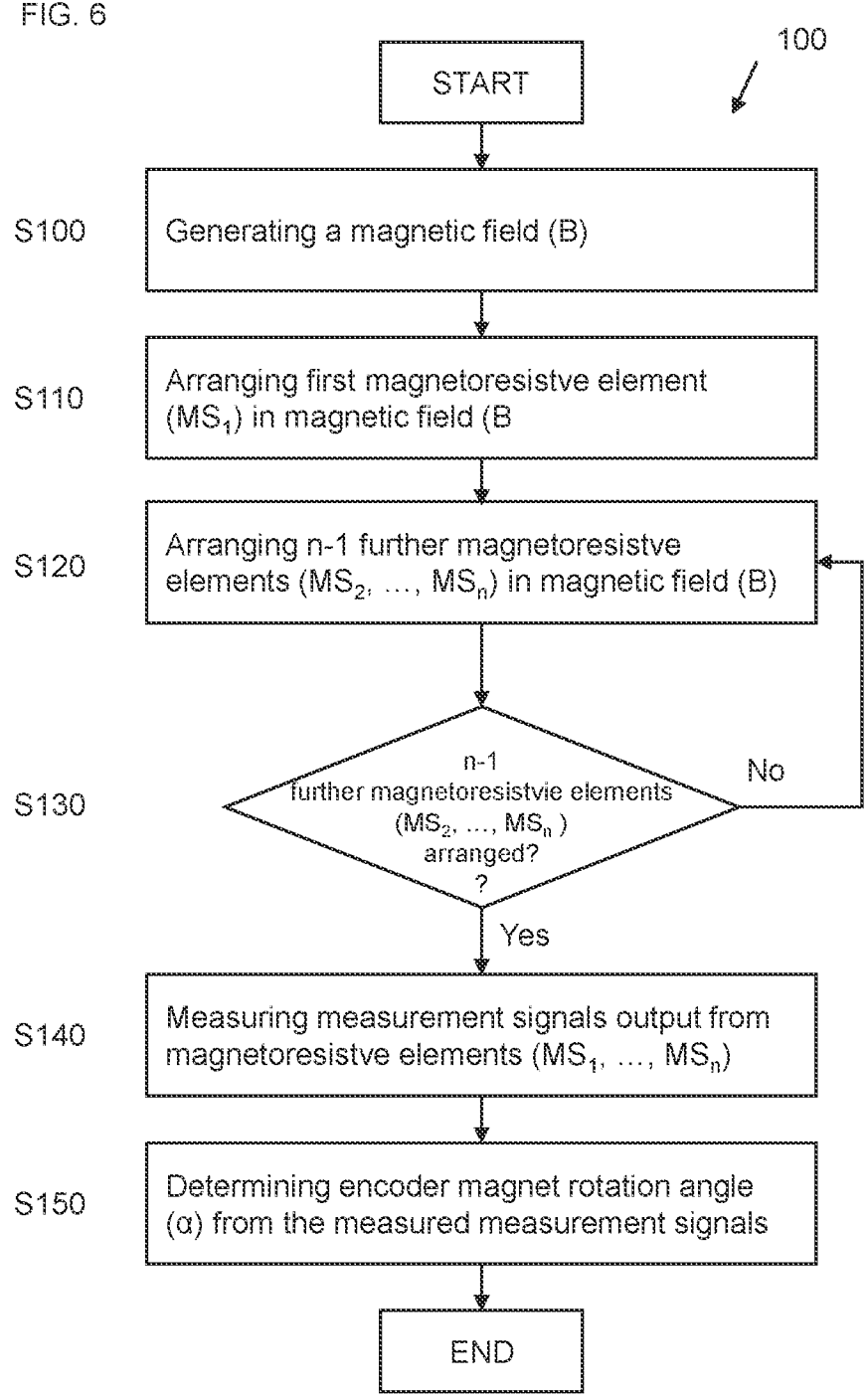
FIG. 6 shows a process flow diagram depicting a method for determining the encoder magnet rotation angle.

FIG. 6 shows a method 100 for determining an encoder magnet rotation angle α of the encoder magnet 15 about the rotation axis A1. In embodiments, the method 100 comprises generating in step S100 the magnetic field B by the encoder magnet 15.

In embodiments, the method 100 comprises further arranging in step S110 the first magnetoresistive element $MS_1$ in the magnetic field B, wherein the first magnetic field vector $v_{B,1}$ at the first position of the first magnetoresistive element $MS_1$ has the first alignment angle $\theta_1$.

In embodiments, the method 100 further comprises arranging in step S120 a number n−1 further ones of the magnetoresistive elements $MS_2, \ldots, MS_n$ at positions in the magnetic field B whose magnetic field vectors $v_{B,2}, \ldots v_{B,n}$ have alignment angles $\theta_2, \ldots, \theta_n$ that satisfy the equation $$\theta_i = \theta_{i-1} + \frac{360°}{n},$$

wherein 1<i≤n.

In embodiments, the method 100 further comprises checking in step S130 whether the total number of n magnetoresistive elements $MS_1, \ldots, MS_n$ have been arranged. Provided that the total number of n magnetoresistive elements $MS_1, \ldots, MS_n$ have been arranged, the measurement signals output from the n magnetoresistive elements $MS_1, \ldots, MS_n$ are measured in step S140. Unless the entire number of n magnetoresistive elements $MS_1, \ldots, MS_n$ have been arranged, step S120 is performed again.

In embodiments, the method 100 further comprises determining in step S150 the encoder magnet rotation angle α from the measured measurement signals. The determination of the encoder magnet rotation angle α is performed, for example, using the signal processor 25.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

LIST OF REFERENCE SIGNS

10 Device
15 Encoder magnet
20 Substrate (for example PCB)
25 Signal processor
B Magnetic field
E Magnetic field plane
MS Magnet sensor or Magnetoresistive element
α Encoder magnet rotation angle
θ Alignment angle

The invention claimed is:

1. A device for determining an encoder magnet rotation angle, wherein the device comprises:
an encoder magnet rotatably arranged about a rotation axis for generating a magnetic field, wherein the magnetic field comprises a plurality of plane-parallel magnetic field planes, wherein a surface normal of the plane-parallel magnetic field planes is parallel to the rotation axis, and wherein the magnetic field further comprises a plurality of magnetic field vectors arranged in the plane-parallel magnetic field planes; and
a number n greater than or equal to two magnet sensors arranged in at least one of the plane-parallel magnetic field planes, wherein a first magnetic field vector has a first alignment angle at a position of a first magnet sensor, and wherein a number n−1 of further ones of the magnet sensors are arranged at positions in the magnetic field whose magnetic field vectors have alignment angles which substantially satisfy the equation:

$$\theta_i = \theta_{i-1} + \frac{360°}{n},$$

wherein $1 < i \leq n$.

2. The device according to claim 1, wherein
the alignment angles of the magnetic field vectors are measured relative to an x-axis of a base coordinate system;
the alignment angles of the magnetic field vectors are measured about a rotation axis which is arranged parallel to the rotation axis of the encoder magnet; and
the alignment angles extend in one of the plane-parallel magnetic field planes.

3. The device according to claim 1, wherein
the n magnet sensors are arranged along a respective magnetic field vector of constant magnetic field strength.

4. The device according to claim 1, wherein
the n magnet sensors are arranged in a single one of the plane-parallel magnetic field planes.

5. The device according to claim 1, wherein
the n magnet sensors are arranged in different ones of the plane-parallel magnetic field planes.

6. The device according to claim 1, wherein
the n magnet sensors are arranged at positions in the magnetic field at which a maximum value of an amplitude of the magnetic field vector over a full rotation of the encoder magnet about its axis of rotation in the x-direction of a base coordinate system is equal to the maximum value of the amplitude of the magnetic field vector in the y-direction.

7. The device according to claim 1, wherein
the n magnet sensors comprise at least two of a tunnel magnetoresistance element, a giant magnetoresistance element, a 1D Hall sensor element, an anisotropic magnetoresistance element, and a fluxgate element.

8. The device according to claim 1, which device comprises
a number of n greater than or equal to three magnet sensors, wherein the number of n greater than or equal to three magnet sensors comprises at least one of a tunnel magnetoresistance element, a giant magnetoresistance element, a 1D Hall sensor element, an anisotropic magnetoresistance element, and a fluxgate element, respectively.

9. The device according to claim 1, wherein
the encoder magnet comprises at least one of a bar magnet, a round magnet, a disc magnet, a ring magnet, and a yoke magnet.

10. A method for constructing an encoder magnet rotation angle determining device, wherein the method comprises:
generating a magnetic field by the encoder magnet, wherein the magnetic field comprises a plurality of plane-parallel magnetic field planes, wherein a surface normal of the plane-parallel magnetic field planes is parallel to the rotation axis, and wherein the magnetic field further comprises a plurality of magnetic field vectors;
arranging a first magnet sensor in the magnetic field, wherein a first magnetic field vector at a position of a first magnet sensor has a first alignment angle;
determining a measurement signal output from the first magnet sensor; and
arranging a number of n−1 further ones of the magnet sensors at positions in the magnetic field whose magnetic field vectors have alignment angles satisfying the equation $$\theta_i = \theta_{i-1} + \frac{360°}{n},$$

wherein $1 < i \leq n$; and
determining a measurement signal output from the n−1 further arranged magnet sensor.

11. A device for determining an encoder magnet rotation angle, wherein the device comprises:
an encoder magnet rotatably arranged about a rotation axis for generating a magnetic field, wherein the magnetic field comprises a plurality of plane-parallel magnetic field planes, wherein a surface normal of the plane-parallel magnetic field planes is parallel to the rotation axis, and wherein the magnetic field further comprises a plurality of magnetic field vectors arranged in the plane-parallel magnetic field planes; and
a number n greater than or equal to two magnetoresistive elements arranged in at least one of the plane-parallel magnetic field planes, wherein a first magnetic field vector has a first alignment angle at a position of a first magnetoresistive element, and wherein a number n−1 of further ones of the magnetoresistive elements are arranged at positions in the magnetic field whose magnetic field vectors have alignment angles which substantially satisfy the equation:

$$\theta_i = \theta_{i-1} + \frac{360°}{n},$$

wherein $1 < i \leq n$.

12. The device according to claim 11, wherein
the alignment angles of the magnetic field vectors are measured relative to an x-axis of a base coordinate system;
the alignment angles of the magnetic field vectors are measured about a rotation axis which is arranged parallel to the rotation axis of the encoder magnet; and
the alignment angle extends in one of the plane-parallel magnetic field planes.

13. The device according to claim 11, wherein
the n magnetoresistive elements are arranged along a respective magnetic field vector of constant magnetic field strength.

14. The device according to claim 11, wherein
the n magnetoresistive elements are arranged in a single one of the plane-parallel magnetic field planes.

15. The device according to claim 11, in which
the n magnetoresistive elements are arranged in different ones of the plane-parallel magnetic field planes.

16. The device according to claim 11, wherein
the magnetoresistive elements comprise at least one of a magnetic tunnel resistor, a giant magnetoresistance, and an anisotropic magnetoresistance element.

17. The device according to claim 11, wherein
the encoder magnet comprises at least one of a bar magnet, a disc magnet, a ring magnet, and a yoke magnet.

18. A method for determining an encoder magnet rotation angle of an encoder magnet about a rotation axis, wherein the method comprises:
generating a magnetic field by the encoder magnet, wherein the magnetic field comprises a plurality of plane-parallel magnetic field planes, wherein a surface normal of the plane-parallel magnetic field planes is parallel to the rotation axis, and wherein the magnetic field further comprises a plurality of magnetic field vectors;
arranging a first magnetoresistive element in the magnetic field, wherein a first magnetic field vector at a position of a first magnetoresistive element has a first alignment angle; and
arranging a number n−1 of further ones of the magnetoresistive elements at positions in the magnetic field whose magnetic field vectors have alignment angles satisfying the equation $$\theta_i = \theta_{i-1} + \frac{360°}{n},$$

wherein $1 < i \leq n$;
measuring the measurement signals output from the n magnetoresistive elements; and
determining the encoder magnet rotation angle from the measured measurement signals.

* * * * *